United States Patent Office 3,392,139
Patented July 9, 1968

3,392,139
ELECTROSCOPIC POWDER CONTAINING
TITANIA-CALCIUM SULFATE PIGMENT
Robert W. Dingman, Plainsboro, N.J., assignor, by mesne assignments, to Monsanto Graphic Systems, Inc., St. Louis, Mo., a corporation of Delaware
No Drawing. Filed May 3, 1965, Ser. No. 452,926
6 Claims. (Cl. 260—41)

ABSTRACT OF THE DISCLOSURE

A free-flowing, fusible, electroscopic powder and a method for its preparation is disclosed. A dispersion by weight of 2 to 30 parts of titania-calcium sulfate pigment and from 1 to 30 parts of an organic pigment such as copper phthalocyanine blue, halogenated copper phthalocyanine, A.A.O.T. benzidine yellow or B.O.N. red in a solution of 100 parts of a fusible resin such a polystyrene, methyl methacrylate or a polyamide is prepared. The dispersion is spray dried to produce spherical particles which are coated with 0.1 to 1% by weight of colloidal silica.

BACKGROUND OF THE INVENTION (1) *Field of the invention*

This invention relates to improvements in electroscopic powders used in electrostatic printing systems and more particularly to improvements therein.

(2) *Description of the prior art*

An electrostatic printing system has been described in Patent No. 3,081,698 wherein a screen having apertures therein only in a shape of an image desired to be printed is placed opposite to an opposing backing electrode. A source of DC electric potential is applied between the screen and the backing electrode for the purpose of establishing an electric field therebetween. Electroscopic powder particles charged electrostatically opposite to the charge of the backing electrode which are of physical size smaller than the screen apertures are urged through the screen apertures into the electric field. The powder particles are then directed by operation of the electric field on them to the backing electrode where they remain, forming the same images as defined by the apertures of the screen. Paper or other material may be inserted between the screen and the backing electrode if it is desired to print on a material other than the backing electrode.

The resulting image deposit is a tightly adhering film of dry powder, held to the substrate by electrostatic forces of adhesion. The deposit in this stage is not permanent and can be dislodged or smeared by direct contact. Permanent "fixing" of the image is achieved by causing the individual powder particles to flow together and "wet" the substrate either by heating the image or by momentarily partially dissolving the image by using suitable solvent vapors.

It has been found that electroscopic ink must be carefully formulated to work well in an electrostatic printing system of the type described.

Electroscopic powder particles used in the system must have physical characteristics that will allow them to transfer across the printing gap in such a manner so as to faithfully reproduce the desired image. Characteristically, powders that are not specifically designed for use in this system fail to give completely faithful printing reproduction quality. In many cases, this lack of quality appears in the form of image scatter, that is, a halo of powder particles are formed around the specifically desired image areas. The specific formulation of an ink to be used in the electrostatic printing system can have a large effect on the amount of scatter a particular ink will exhibit.

The particle size distribution of a powder should be maintained within controlled limits to minimize the possibility of image scatter. An ink to be used in the electrostatic printing process must, when in its bulk form, be free enough from agglomeration and stickiness to allow precise quantities to be metered to the powder feed devices.

The powder to be used in an electrostatic printing system must be compatible with the substrate that it is desired to print. Compatibility is a function of the physical formulation of the powder material and of the physical characteristics of the substrate. Quite obviously, each particular substrate has characteristics perculiar to it alone, and an ink that is designed for use on paper might be quite unsatisfactory for use on plastic. Efforts to print on a plastic, such as polystyrene, with available powders have not produced satisfactory results. The problem that arises in printing on plastics which are heat sensitive is that the "fixing" of the ink deposited on the surface is done with heat, at temperatures within the softening range of the plastic.

Accordingly, it is an object of this invention to provide an ink for use in the electrostatic printing system of such a composition and such a particle size range that it prints with great precision showing little or no image scatter.

Another object of the present invention is the provision of a powder in the electrostatic printing system which in its bulk state is free flowing and can be successfully controlled and metered.

Still another object of the present invention is the provision of an ink for use in the electrostatic printing system that is compatible with a plastic material such as polystyrene, such that the fused image has exceptional adhesion and wear resistance qualities.

Yet another object of the present invention is the provision of an ink for use in the electrostatic printing system that can be fused to the surface of a heat sensitive polystyrene by a suitable application of radiant energy in the form of heat.

SUMMARY OF THE INVENTION

These and other objects of the present invention may be achieved by combining a base resin such as polystyrene, or methyl methacrylate or polyamide with titania-calcium sulfate pigment and a proper color, charge-orienting pigment. The base resin may constitute 100 parts by weight. The titanium-calcium sulfate may range from 2 to 30 parts by weight. The charge-orienting pigment may range from 1 to 20 parts by weight. The relative percentages of titania-calcium sulfate may range from 0% to 100% titania.

A preferred composition will include, by weight:

100 parts of polystyrene resin. A suitable resin is called "Piccolastic," No. D100, has an estimated molecular weight of 1500, and is purchaseable from the Pennsylvania Industrial Chemical Company.

10 parts of titania-calcium sulfate combination pigment. A suitable titania material containing 70% by weight calcium sulfate is purchaseable from the Titanium Pigment Corporation and is called Titanox-RCHTX.

An organic pigment such as 5 parts of copper phthalocyanine blue. A suitable material is purchaseable from the General Aniline & Film Corp., and is called Heliogen Blue BG Toner, No. 56–6091.

The blue pigment is added where a blue color ink is desired. For a green color ink, 5 parts of halogenated copper phthalocyanine is added instead of the copper phthalocyanine blue. A suitable green pigment is purchaseable from General Aniline & Film Corp. and is designated as Heliogen Green Toner, No. 66–3001.

If a yellow color is desired, then 5 parts of A.A.O.T. benzidine yellow may be added in place of the other pigment. A suitable yellow is available as Permagen Yellow GAN Toner, No. 12–3041, made by General Aniline & Film Corp. For obtaining a red ink, B.O.N. red is used as a pigment. This can be Bonadur Red Y–20–6440, made by American Cyanamid Company.

The method of preparation first involves dissolving the resin in a suitable solvent. A suitable solvent is one which has a boiling point higher than the melting point of the resin. An example of a suitable solvent is xylene. The pigments are ground and dispersed in the solvent-resin solution by ball milling for twenty-four hours at high concentration, i.e. 50% solids, adjusted to give the proper viscosity for effective grinding action. Then the ground dispersion is diluted to final concentration suitable for spray drying. The grinding is used to reduce the pigment particle size to give as homogeneous a mixture as possible.

This mixture of base resin and pigments is then dissolved, dispersed, and diluted to a 10% by weight dispersion using xylene solvent. The dispersion is spray dried resulting in a powder which may have, for example, the following particle size frequency distribution—

| Microns: | Percent |
| --- | --- |
| 0 to 2.5 | 0 |
| 2.5 to 5 | 4.7 |
| 5 to 10 | 61 |
| 10 to 15 | 32.9 |
| 15 to 20 | 1.4 |
| 20 to 25 | 0 |

To the resulting powder, from 1/10 of 1% up to 2% by weight, of a collodial pyrogenic silica is added. This may be, for example, CAB-O-SIL, M5, a product made by the Cabot Corporation. The use of this material in conjunction with the very spherical shapes of the particles produced by spray drying above the melting point of the resin, produces a powder that is quite free flowing and meets all the objects of this invention.

It was found that even though the ink contained a resin such as polystyrene resin, it could be thermally fixed to the surface of a thermoplastic container without deforming the container surface by reason of the high infrared absorption characteristics of the calcium sulfate included in the titania whereby a preferential heating of the ink occurs. The titania was added merely as a brightener, but provided the unexpected benefit of improving the spray drying, giving a narrower particle size distribution and a lower average particle size. The addition of the colloidal silica was to maintain discrete free flowing particles, but provided an unexpected benefit in an enhancement of the electrostatic properties of the ink. The particles charged more uniformly.

There has accordingly been described herein a novel and useful formulation that produces a successful powder for use in electrostatic printing systems.

What is claimed is:

1. An electroscopic ink powder formulation comprising:
   spray dried particles having a particle size distribution within controlled limits to minimize image scatter on electrostatic printing therewith, said particles comprising a heat fusible resin containing a homogeneous dispersion in parts by weight based on a hundred parts by weight of resin of 2 to 30 parts of titania-calcium sulfate pigment and from 1 to 20 parts of a charge orienting organic pigment and a coating of from 0.1 to 2% of the weight of said particle of colloidal silica on said particles.

2. An electroscopic powder according to claim 1 in which the particles are spherical.

3. An electroscopic ink powder formulation as recited in claim 1 wherein said heat fusible resin is one of the group consisting of polystyrene, methyl methacrylate, and polyamide.

4. An electroscopic ink powder formulation as recited in claim 3 wherein said charge orienting organic pigment is one of the group consisting of copper phthalocyanine blue, halogenated copper phthalocyanine, A.A.O.T. benzidine yellow and B.O.N. red.

5. An electroscopic ink powder formulation containing spherical, spray-dried particles having a particle size distribution maintained within controlled limits to minimize image scatter on electrostatic printing therewith, said particles comprising a heat fusible resin containing a dispersion on a weight basis of about 10 parts of titania-calcium sulfate pigment containing about 70% by weight calcium sulfate, 5 parts of a charge orienting organic pigment selected from the group consisting of copper phthalocyanine blue, halogenated copper phthalocyanine, A.A.O.T. benzidine yellow or B.O.N. red in 100 parts of polystyrene and a coating on said particles of 0.1 to 2% by weight of colloidal silica.

6. The method of making an electroscopic ink powder formulation comprising mixing by weight proportions 100 parts of heat fusible resin, 10 parts titania-calcium sulfate combination, containing about 70% by weight of calcium sulfate, and 5 parts of a charge orienting organic pigment, dissolving and dispersing said mixture in xylene to produce a 10% by weight dispersion, spray drying said dispersion to produce a powder having a particle size distribution controlled to minimize image scatter on electrostatic printing therewith, and mixing said powder with 1/10 of 1% by weight of colloidal silica.

References Cited

UNITED STATES PATENTS

| 2,986,521 | 5/1961 | Wielicki | 252—62.1 |
| Re. 25,136 | 3/1962 | Carlson | 252—62.1 |
| 3,041,169 | 6/1962 | Wielicki | 96—1 |

ALLAN LIEBERMAN, *Primary Examiner.*